United States Patent [19]
Shimizu et al.

[11] Patent Number: 5,817,989
[45] Date of Patent: Oct. 6, 1998

[54] VEHICLE-LOAD-WEIGHT DISPLAY SYSTEM

[75] Inventors: Shinichiro Shimizu; Yoji Nakazaki, both of Shimada, Japan

[73] Assignee: Yazaki Corporation, Tokyo, Japan

[21] Appl. No.: 531,647

[22] Filed: Sep. 21, 1995

[30] Foreign Application Priority Data

Nov. 7, 1994 [JP] Japan ................................ 6-272483

[51] Int. Cl.⁶ .................................................. G01G 19/02
[52] U.S. Cl. ..................... 177/136; 177/25.13; 177/25.19
[58] Field of Search .............................. 177/25.11, 25.12, 177/25.13, 25.19, 136, 137, 138, 139, 141; 364/569

[56] References Cited

U.S. PATENT DOCUMENTS 4,839,835   6/1989   Hagenbuch ......................... 177/136 X

FOREIGN PATENT DOCUMENTS

WO89/01136   2/1989   WIPO .
WO89/01137   2/1989   WIPO .

*Primary Examiner*—Michael L. Gellner
*Assistant Examiner*—Randy W. Gibson
*Attorney, Agent, or Firm*—Armstrong, Westerman, Hattori, McLeland, & Naughton

[57] ABSTRACT

A vehicle-load-weight display system includes a weight calculating means 1 which obtains the load weight from output signals from sensors mounted in a vehicle, a display means 2 displaying the load weight obtained by the calculating means 1, and a display control means 3 controlling the display means 2 during a run so as to display the load weight obtained prior to the run. The weight calculating means 1 obtains the load weight from output signals provided by the weight sensors in the initial part of each period at constant intervals, and the display control means 3 decides whether the vehicle is running by a pulse outputted from a run sensor during each of multiple periods. A detecting means 4 detecting the start of loading and unloading works when a given time has passed after the vehicle stopped running. During the period from the detection of the start of loading and unloading works to the start of the vehicle running, the weight calculating means 1 calculates the difference in the load weights between the present period and the previous period, and moreover the display control means 3 makes the display means 2 display the present weight obtained by adding the difference in the load weights to the previously displayed weight.

13 Claims, 13 Drawing Sheets

F I G. 1
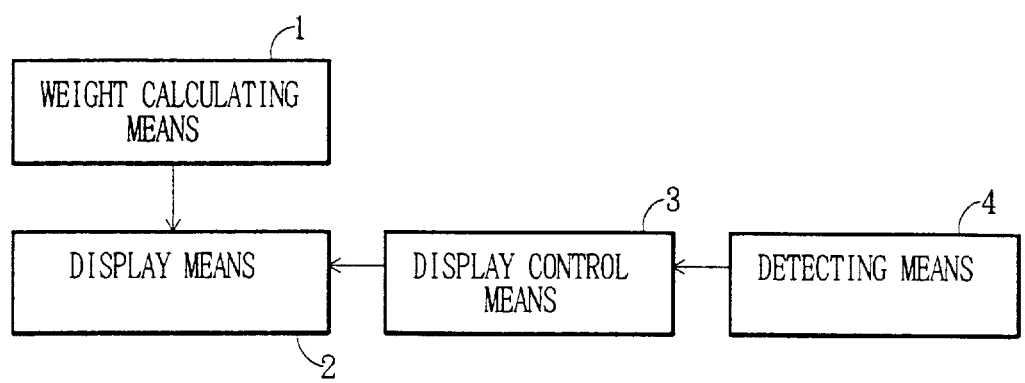

F I G. 1 0
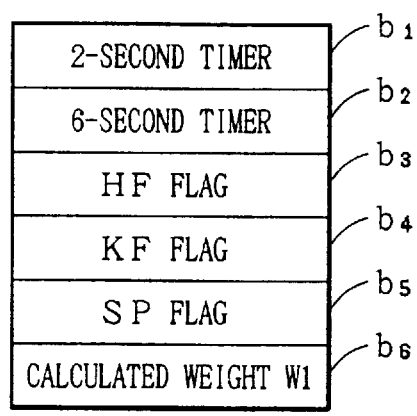
F I G. 1 1
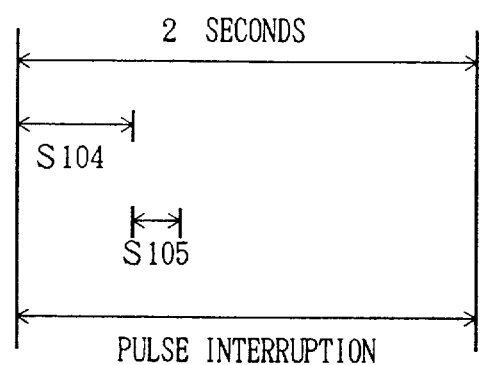

F I G. 1 3
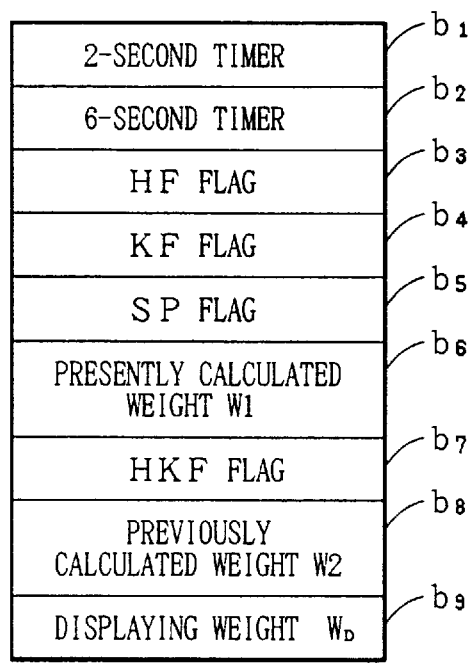

F I G. 1 5
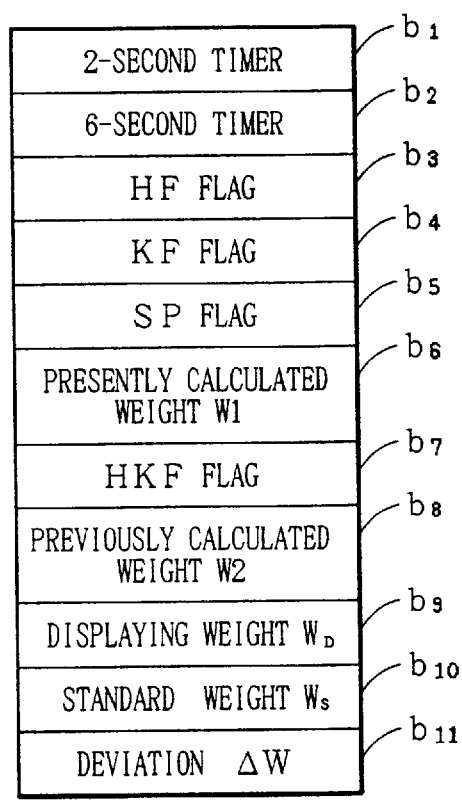

VEHICLE-LOAD-WEIGHT DISPLAY SYSTEM

BACK GROUND OF THE INVENTION

1. Field of the Invention

This invention relates to vehicles and particularly to vehicle-load-weight display systems that display the weight of the load on the rear deck of a load carrying vehicle in order to prevent its overload.

2. Description of the Prior Art

Conventional vehicle-load-weight display systems detect the loads provided on the front and rear wheels of the vehicle by the relating sensors so as to display, by a display, the load weight calculated from signals outputted by the sensors and so as to give alarms when the load weight is excessive.

As mentioned above, conventional vehicle-load-weight display systems display the load weight calculated from signals outputted by the sensors mounted in the vehicles, and also give alarms when the load weight is excessive.

However, when the vehicle is running, the loads provided on the relating sensors vary so that the correct load weights can not be displayed; in some cases, the systems may make a decision of an overload and may give a wrong alarm even in case of a non-overload.

SUMMARY OF THE INVENTION

In order to eliminate the aforementioned drawback of the conventional systems, an object of this invention is to provide with a vehicle-load-weight display system improved so as to display correct load weights.

In the first aspect of the invention to achieve the above-mentioned object, a vehicle-load-weight display system, as shown in a basic block diagram of FIG. 1, includes
a weight calculating means 1 which obtains the load weight from output signals of sensors mounted in the vehicle;
a display means 2 displaying the load weight obtained by the calculating means 1;
a display control means 3 controlling the display means 2 during a run so as to display the load weight obtained prior to the run.

In the second aspect of the invention, the vehicle-load-weight display system of the first aspect of the invention further includes that the display control means 3 decides whether the vehicle is running by a pulse outputted from a run sensor.

In the third aspect of the invention, the vehicle-load-weight display system of the first aspect of the invention further includes that the display control means 3 controls the display means 2 so as to display the load weight obtained prior to the run, even during a given stopping period after the run.

In the forth aspect of the invention, the each vehicle-load-weight display system of the first, second, and third aspects of the invention further includes that, if the display control means 3 decides that the vehicle is running, the display control means 3 stops the load weight calculation in the weight calculating means 1 so as to display the load weight obtained prior to the run by the display means 2.

In the fifth aspect of the invention, the vehicle-load-weight display system of the first aspect of the invention further includes that the weight calculating means 1 obtains load weight from output signals provided by weight sensors in the initial part of each period at constant intervals, and the display control means 3 decides whether the vehicle is running by a pulse outputted from the run sensor in the each period at the constant intervals.

In the sixth aspect of the invention, the vehicle load weight display system of the fifth aspect of the invention further includes a detecting means 4 detecting the start of loading and unloading works when a given time has passed after the stop of the vehicle running, wherein, during the period from the detection of the start of loading and unloading works to the start of the vehicle running, the weight calculating means 1 calculates the difference in the load weights between the present time and the previous time, and moreover the display control means 3 makes the display means 2 display the present weight obtained by adding the difference in the load weights to the previously displayed weight.

In the seventh aspect of the invention, the vehicle-load-weight display system of the sixth aspect of the invention further includes that the detecting means 4 detects the start of loading and unloading works by detecting the operation of a switch manually operated at the start of the loading and unloading works.

In the eighth aspect of the invention, the vehicle-load-weight display system of the sixth aspect of the invention further includes that the detecting means 4 detects the start of loading and unloading works by recognizing that the difference in the load weights, between when a predetermined time has passed after the stop of the vehicle running and when the load weight is newly calculated thereafter becomes larger than a predetermined value.

Now, the operation of the invention will be explained in the followings.

The weight calculating means 1 obtains the load weight by output signals from the sensors mounted in the vehicle. The display control means 3 makes the display means 2 display the weight quantity calculated by the weight calculating means 1 when the vehicle is stopping, and, during the run, it makes the display means 2 display the load weight obtained prior to the run.

The display control means 3 may decide whether the vehicle is running and may stop the weight calculation performed by the weight calculating means 1 so as to make the display means 2 display the load weight obtained prior to the run.

Further, the display control means 3 may decide whether the vehicle is running by recognizing the presence of a run pulse from the run sensor mounted in the vehicle.

Further, the display control means 3 may make the display means 2 display the load weight obtained prior to the run even during the given stopping period after the run.

The display control means 3 may decide that the vehicle is running and may stop the load weight calculation in the weight calculating means 1 so as to display the weight obtained prior to the run by the display means 2.

The weight calculating means 1 may obtain the load weight from output signals provided by the weight sensors in the initial part of the each period at the constant intervals, and the display control means 3 may decide whether the vehicle is running by a run pulse outputted from the run sensor in the each period at the constant intervals.

The detecting means 4 may detect the start of loading and unloading works when a given time has passed after the vehicle stopped running, wherein, during the period from the detection of the start of loading and unloading works to the start of the vehicle running, the weight calculating means 1 may calculate the difference in the load weights between the present time and the previous time, and moreover the display control means 3 may make the display means 2 display the present weight obtained by adding the difference in the load weights to the previously displayed weight.

The detecting means 4 detects the start of loading and unloading works by detecting the operation of the switch manually operated at the start of the loading and unloading works.

The detecting means 4 may detect the start of loading and unloading works by recognizing that the difference in the load weights, between when a predetermined time has passed after the vehicle stopped and when a weight is newly calculated thereafter becomes larger than a predetermined value.

Next, the effects of the invention will be explained.

As mentioned above, since the load weight obtained prior to the run is displayed during the run, the correct load weight can be displayed even if variable dynamic loads are provided on the sensors due to the vehicle running.

Further, since whether the vehicle is running or stopping is decided by recognizing the presence of a run pulse from the run sensor mounted in the vehicle, it is easy to decide whether the vehicle is running or not.

Further, since the load weight obtained prior to the run is displayed even during the given stopping period after the run, the correct carrying load can be displayed instead of displaying the load affected by the sway of the vehicle in the transient period just after the vehicle has stopped.

Further, since, when it is decided that the vehicle is running, the weight calculation process is stopped to display the load weight obtained prior to the run, the load of the processor in use may be reduced.

Further, the load weight is calculated from output signals provided by the sensors in the initial part of each period at the constant interval. While the load weight obtained prior to the run is displayed when the vehicle is running at the end of the each period of the constant interval. Therefore, the correct carrying load can be displayed even if the dynamical load is provided on the sensors when the vehicle starts.

Further, the start of loading and unloading works is detected when the given time has passed after the vehicle stopped running; during the period from the detection of the start of loading and unloading works to the start of the vehicle running, the difference in the load weights between the present time and the previous time is calculated; and moreover the present weight obtained by adding the difference in weight to the previously displayed weight is displayed. Therefore, the correct carrying load can be displayed even if the place where the vehicle is stopping during the loading and unloading works has an inclination, because only the difference in the load weights caused by the loading and unloading is added.

Further, the start of loading and unloading works is recognized by detecting the operation of the switch manually operated at the start of the loading and unloading works. Therefore, the correct carrying load can be displayed even if the difference in the load weights caused by the loading and unloading is very small.

Further, the start of loading and unloading works is detected by recognizing that the difference in the load weights, between when the predetermined time has passed after the vehicle stopped and when the load weight is newly calculated thereafter becomes larger than the predetermined value. Therefore, the weight indication is changed, to display the correct load weight, only when the load weight is changed by the loading and unloading. Also, no manual operation is needed, which can surely eliminate the drawback that the present weight becomes unknown by unintentionally omitting the manual operation.

BRIEF DESCRIPTION OF THE DRAWINGS

FIG. 1 is a basic block diagram of the present invention;

FIG. 10 is a memory map for the work areas used in FIG. 9;

FIG. 11 is a diagram illustrating an operation in the operation flow chart of FIG. 9;

FIG. 13 is a memory map for the work areas used in FIG. 12;

FIG. 15 is a memory map for the work areas used in FIG. 14.

DETAILED DESCRIPTION OF THE PREFERRED EMBODIMENTS

Figure 2:
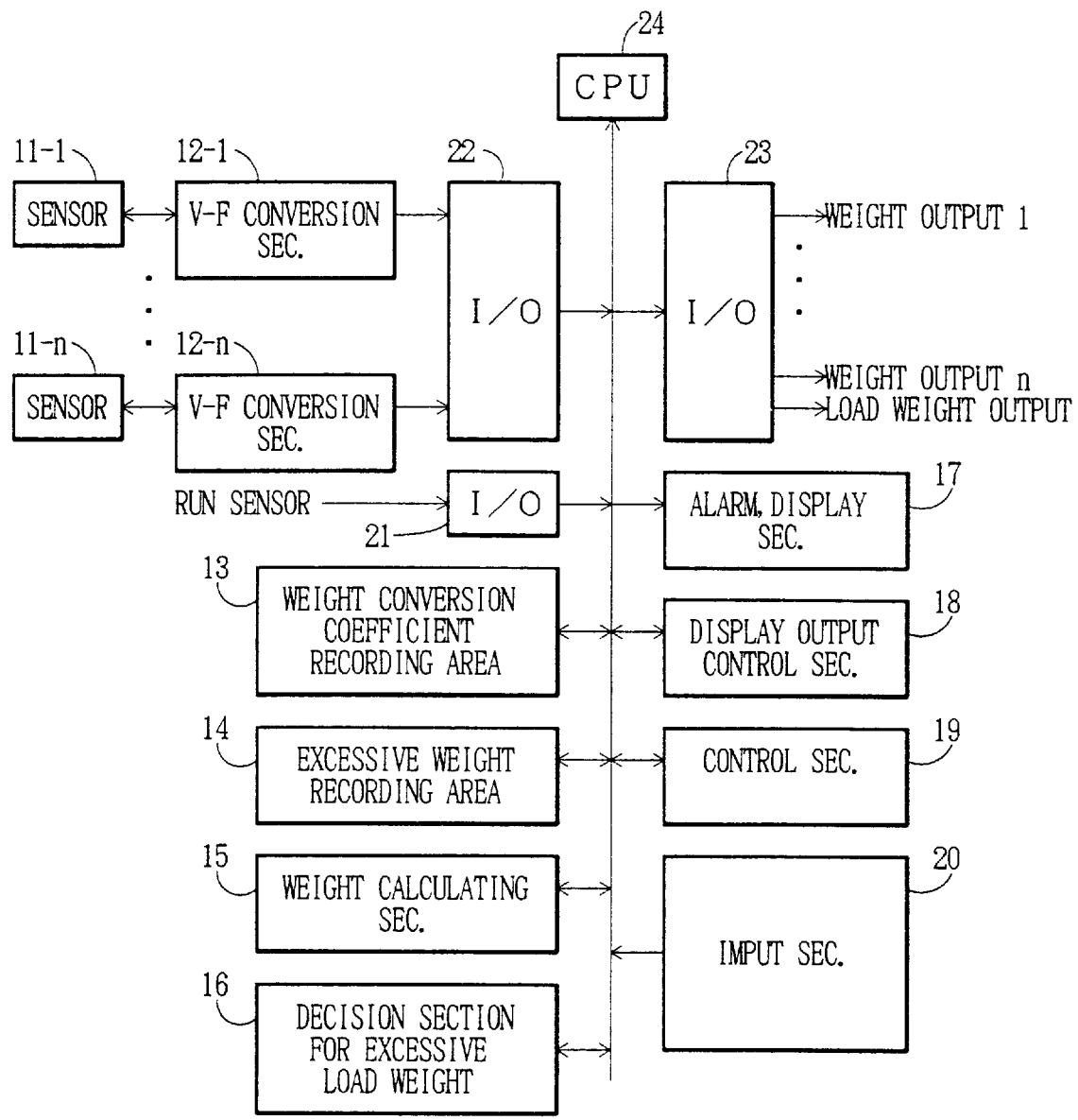
FIG. 2 is a block diagram of an embodiment in respect of the present invention.
Figure 3:
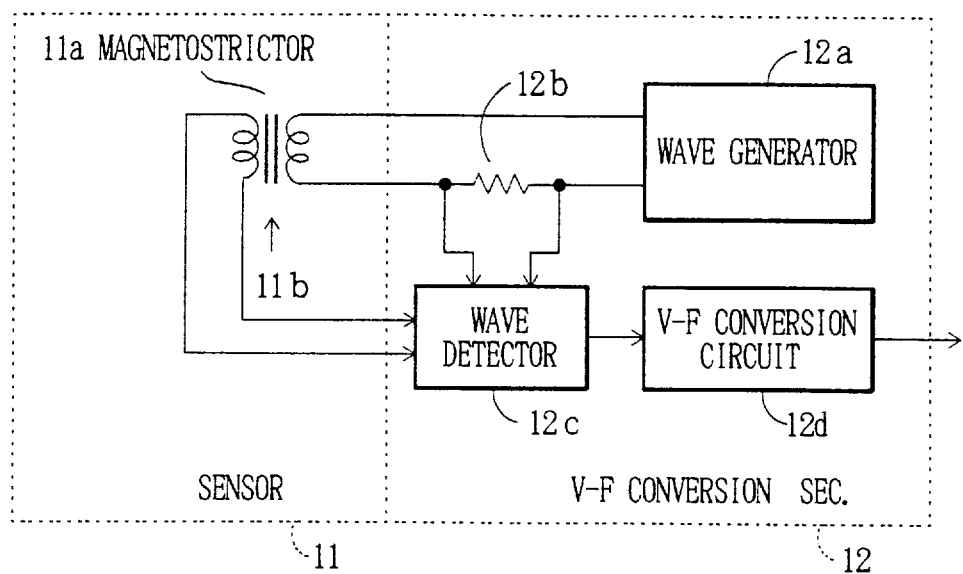
FIG. 3 is a specific example of the sensors and the V-F conversion section in the same embodiment.
Figure 4:
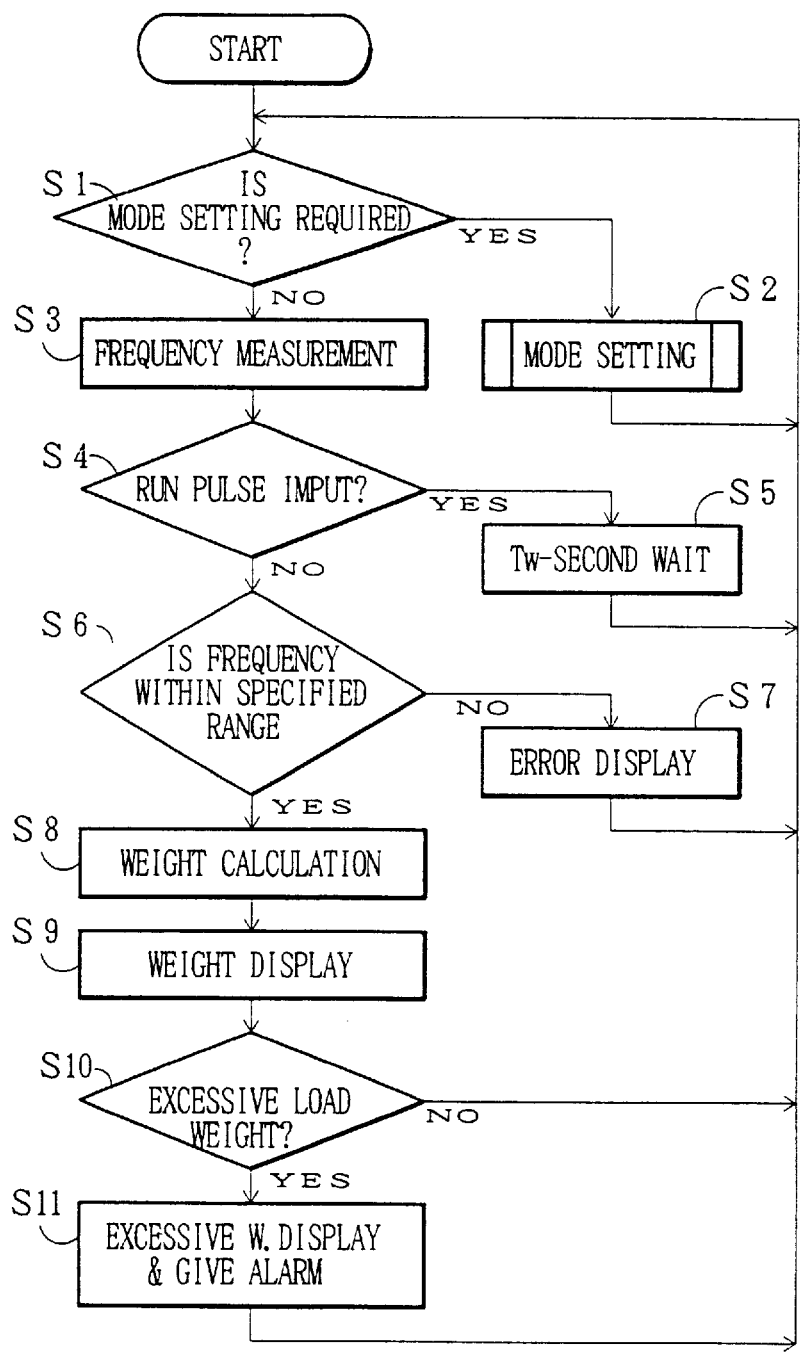
FIG. 4 is an operation flow chart of the same embodiment.
Figure 5:
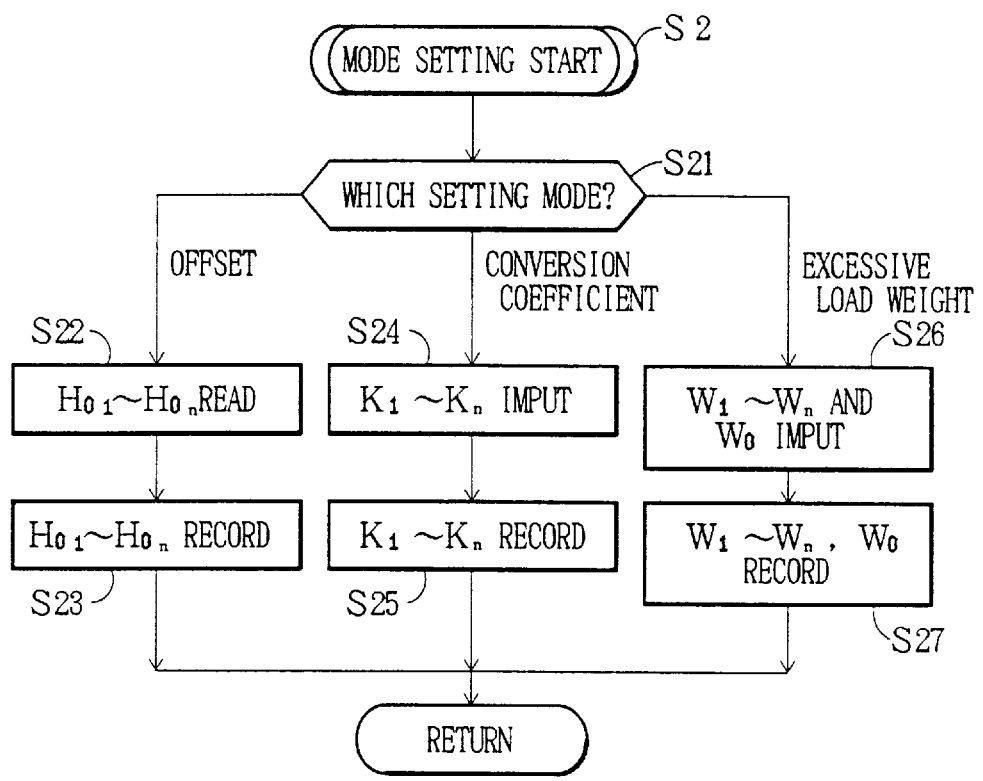
FIG. 5 is an operation flow chart of the same embodiment.

A preferred embodiment of the present invention is explained as referring to FIGS. 2 to 5. FIG. 2 is a block diagram of a preferred embodiment of the present invention; FIG. 3 is a specific example of the sensors and the V-F conversion section in the embodiment; and, FIGS. 4 and 5 are operation flow charts in the embodiment.

In FIG. 2, designated 11 is a sensor; designated 12 is a V-F conversion section outputting frequency pluses with a frequency proportional to a voltage provided from the sensor 11; designated 13 a weight conversion coefficient recording area; designated 14 an excessive load weight recording area; designated 15 a weight calculating section; designated 16 a decision section for over load weights; designated 17 an alarm, indication section; designated 18 a display, output control section; designated 20 an input section; designated 19 a control section for the other control; designated 21 to 23 interfaces (I/O); and designated 24 a processor(CPU).

As shown in FIG. 3, the sensor 11 is composed of a transformer 11b having magnetic flux paths of a magnetostrictor 11a. Further, the V-F conversion section 12 is composed of a wave generator 12a, a resistor 12b, a wave detector 12c, and a V-F conversion circuit 12d.

When the magnetostrictor 11a receives a load to give strains therein, its magnetic permeability changes, which results in a change of the voltage inducted in the secondary coil of the transformer 11b.

The voltage inducted in the secondary coil is converted to a direct current by the wave detector 12c to output a pulse having a frequency proportional to the direct-current voltage brought by the V-F conversion circuit 12d.

Besides, the resistor 12b of a high resistance value keeps the current-flow in the primary coil of the transformer 11b constant even if the output amount from the wave generator 12a changes a little.

Further, the wave detector 12c makes a multiplying detection in respect of the output signals from the secondary coil of the transformer 11b and the signal generated by the resistor 12b so as to reduce their noises.

The sensors 11-1 to 11-n are mounted, for example, on the all brackets that connect the chassis with the springs and transfer the vehicle weight to the front and rear wheels.

Figure 6:
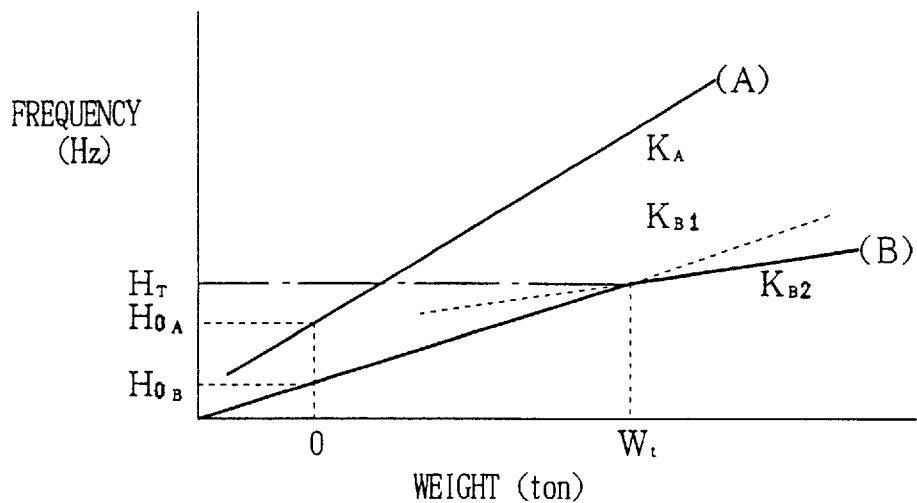
FIG. 6 is a diagram showing a conversion from the weight to the frequency.

When the sensor 11 receives a load, as shown in FIG. 6, a pulse with a frequency corresponding to the received load is outputted from the V-F conversion section 12.

Depending on the characteristics of the sensor 11 and the V-F conversion section 12, the relation between the weights and the frequencies is linear as shown in FIG. 6A, or non-linear as shown in FIG. 6B.

The weight conversion coefficient recording area 13 stores in advance the conversion coefficient $K_A$ for a sensor with the characteristics shown in FIG. 6A, while it stores the conversion coefficient $K_B1$ used up to the frequency $H_T$ of the characteristics transient point and the other conversion coefficient $K_B2$ used above $H_T$.

Further, to display a vehicle load weight, the vehicle itself weight should be deducted. Therefore, after the sensors 11 has been mounted on the vehicle, the frequency Ho outputted from the V-F conversion section 12 is measured under the vehicle unloaded condition to be stored in the weight conversion coefficient recording area 13.

The excessive weight recording area 14 stores in advance the standard weight values corresponding to each of the sensors 11-1 to 11-n to decide whether each of the weights loaded on the sensors is excessive, and the standard weight value corresponding to the all weight loaded on the vehicle that is used for the decision of an over load.

Besides, the weight conversion coefficient recording area 13 and the excessive weight recording area 14 are composed of non-volatile memories so that the stored data may not be deleted even if the electric power has been off.

Next, referring to FIG. 4, the operation of the embodiment will be explained.

In step S1, the control section 19 decides whether a mode input from an input section 20 is required, which sets data in the weight conversion coefficient recording area 13 and the excessive weight recording area 14. Then, if the decision is YES, the program execution proceeds to step S2 to carry out a setting process as will be discussed later by referring FIG. 4.

In step S3, the control section 19 calculates the frequency of the pulse provided from I/O 22.

Figure 7:
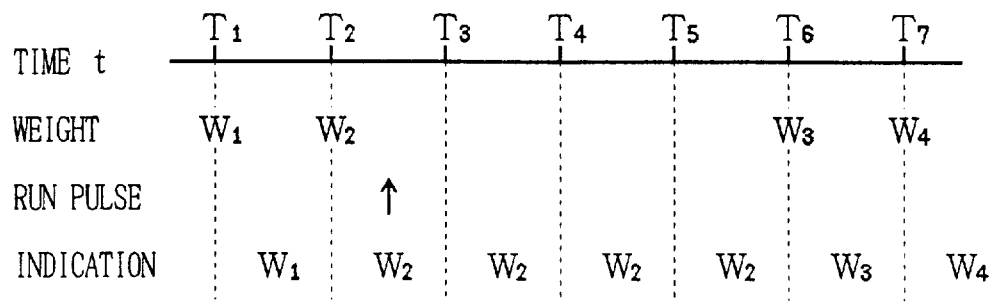
FIG. 7 is a diagram showing the relation between the calculated weight and the weight indication.

That is, the frequency H is obtained as follows;

$$Hi=Ni/To \qquad (1)$$

where:
Hi; the frequency corresponding to the number i sensor
To; a given period (second)
Ni; the number of the pulses outputted within To seconds in the number i sensor In step S4, the display, output control section 18, as shown in FIG. 7, decides whether a pulse is inputted through I/O 21 from the run sensor mounted on the vehicle during a given period, that is, until a timer (not shown) times out. If the decision is YES, the execution proceeds to step S5. Then, the execution returns to S1 after a Tw second wait.

That is, step S4 decides whether the vehicle is running or stopping.

In step S6, the weight calculating section 15 decides whether the frequency obtained in step S3 is within a specified range. If the decision is NO, the execution proceeds to step S7 to give an error indication in the alarm, indication section 17.

That is, in case that an abnormal measured value, for example, due to a noise inclusion, is obtained, step S6 gives an error indication and also deletes the value.

In step S8, the weight calculating section 15 picks up the conversion coefficient K and an offset value Ho from the weight conversion coefficient recording area 13 to calculate the weight.

That is, a load weight W is obtained as follows;

$$Wi=Ki\ (H-Ho) \qquad (2)$$

$$W=W1+W2+\ldots+Wn \qquad (3)$$

where:
Ki; the conversion coefficient corresponding to the number i sensor
Ho; the offset value corresponding to the number i sensor
H; the frequency corresponding to the number i sensor
Besides, for sensors having a non-linear characteristics as shown in FIG. 6B, a weight Wi is obtained as follows;
in the range $H<H_T$ (the transient point frequency)

$$Wi=K1i\ (H-Ho) \qquad (4)$$

in the range $H \geq H_T$ $$Wi=K1i\ (H_T-Ho)+K2i\ (H-H_T) \qquad (5)$$

In step S9, the display, output control section 18 displays the load weight W obtained by step S8, in the alarm, indication section 17, and also outputs it through the I/O 23. Moreover, through the I/O 23, the weight Wi loaded on each of the sensors, which is calculated by the equation (2), is also outputted.

The data outputted through the I/O 23 are stored, according to the requirement, in a connected recording unit in order to be used for managing the vehicle run condition.

In step S10, the decision section 16 for excessive load weights decides whether the weight obtained in step S9 is an excessive load weight as referring to the data stored in the excessive weight recording area 14. If the decision is NO, the execution returns to step S1.

Step S11, in case that the decision is an excessive load weight, gives an alarm by a buzzer and also gives a notice of an excessive load weight on the display in the alarm, indication section 17. Further, the number of the sensor and the obtained load weight are outputted with a flag added for showing an excessive load.

By repeating the aforementioned operation, as shown in FIG. 7, a run pulse (pulse generated by vehicle running) may be detected between clock times T2 and T3. In that case, the weight calculation process is not carried out by the Tw second wait in step 5. And, the weight W2 obtained at the clock time T2 is outputted to be displayed.

After the Tw second wait, the weight W3 is calculated at the clock time T6 and its result is displayed.

However, if a run pulse is inputted during the Tw wait in step 5, the process is reset and a new Tw second wait begins when the new run pulse is inputted.

When the vehicle stops and no run pulses from the run sensors are outputted, a weight calculation start. However, when the vehicle stops from its run condition, the vehicle body is still moving during a transient period. The movement interferes with the acquirement of a correct load weight. Therefore, after a Tw second wait where the movement dies away, the correct weight is calculated and also to be displayed.

In the above-mentioned embodiment, if a run pulse is detected, the weight calculation is not carried out. However, it may be an alternative that the weight value stored prior to the run is displayed although the weight calculation is continued.

Next, referring to FIG. 5, the setting process will be explained.

In step S21, the control section 19 decides which setting mode has been selected in the input section 20. If the offset value is selected, the execution proceeds to step S22; if the conversion coefficient is selected, the execution proceeds to step S24; and, if the excessive load weight is selected, the execution proceeds to step S26.

In step S22, the control section 19 reads the frequency value measured in step S3. Then, the execution proceeds to step S23 to store the offset value Ho in the weight conversion coefficient recording area 13.

Besides, in step S21, the input section 20 sets an offset value when the vehicle has no loads and is stopping.

Step S24 receives a conversion coefficient K from the input section 20. Then, the execution proceeds to step S25 to store the coefficient in the weight conversion coefficient recording area 13.

In case that the sensor has the non-linear characteristics such as shown in FIG. 6B, the values K1, K2, and the transient frequency $H_T$ are inputted to be stored.

Step S26 receives each of excessive load weights W1 to Wn corresponding to each sensor and the excessive load weight Wo corresponding to the total load weight from the input section 20. Then, the execution proceeds to step S27 to store the values in the excessive weight recording area 14.

In the above mentioned embodiment, when the run pulse from the run sensor is not received, the weight is calculated and displayed. While, when the run-detecting pulse from the run sensor is received, the weight is not calculated and not displayed. However, at the actual start of the vehicle running, the weight may vary, though the wheels do not yet rotate so that the run pulse is not outputted. The reason of it is that the vehicle requires an initial moving force. Therefore, until the power transmitted to the wheels overcomes the initial moving force, the wheels do not rotate so that the vehicle does not actually start to run. Thereby, in the period from the first power transmission to the vehicle-run start, the aft part of the load deck sinks, which brings about an apparent increased load weight. Therefore, in the case that the weight is calculated and displayed such as in the above mentioned embodiment, when the run pulse from the run sensor is not received, a weight y differed from the actual load weight may be displayed during the successive run.

Figure 8:
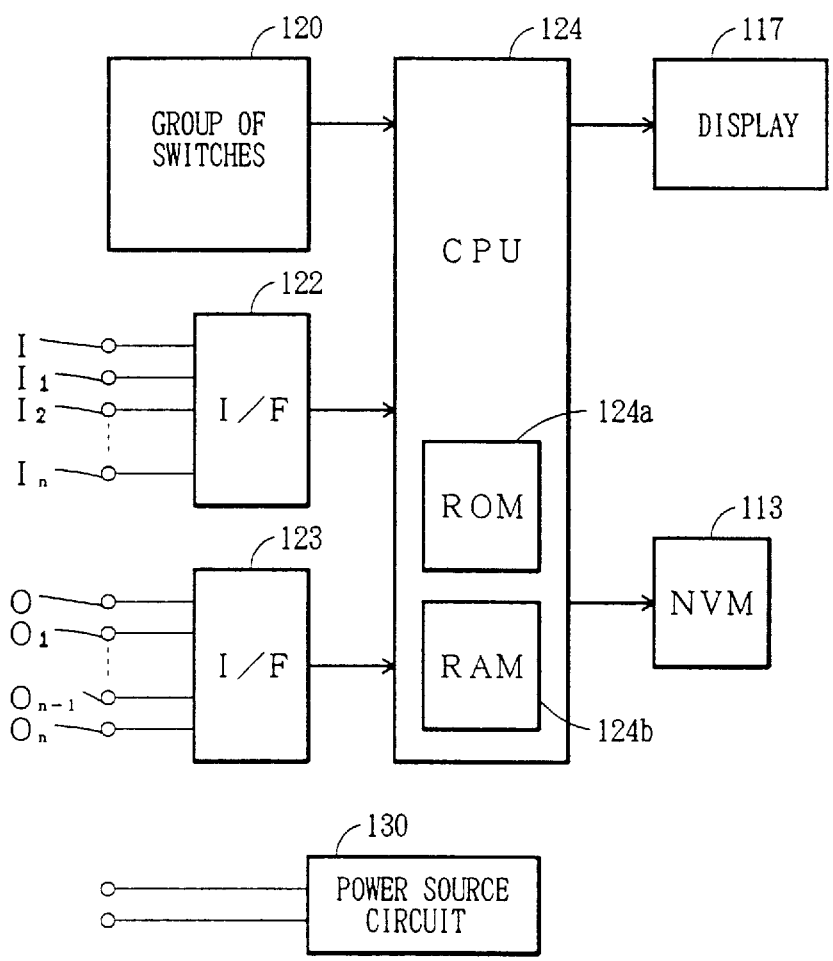
FIG. 8 is a block diagram of another embodiment in regard to the present invention.

Another embodiment to eliminate the above-mentioned disadvantage will be explained as referring to FIGS. 8 to 11. FIG. 8 is a block diagram of the load weight display system in the another embodiment. Designated I is an input terminal for run sensor signal; designated I1 to In are input terminals for weight sensor signals, which receives pulses with a frequency proportional to a voltage. Besides, the weight sensors have the construction shown in FIG. 3. The signals inputted to the input terminals I and I1 to In are provided, via an interface (I/F) circuit 122, to a one-chip microcomputer (CPU) 124.

CPU 124 includes ROM 124a storing a control program; RAM 124b having a data area storing various kinds of data, a work area used for process operations of CPU 124, and so on. CPU 124 operated according to the control program acts as the weight calculating section 15 of the weight calculating means 1; the decision section 16 for excessive load weights; the display control means 3; the display, output control section 18; the other control section 19; and the detecting means 4, which are mentioned in the embodiment of FIG. 2.

Further, CPU 124 connects with a group of switches 120 to act as the input section 20 in the embodiment of FIG. 2 are connected, and with a display section 117 to act as the alarm, indication section 17 of the display means 2 in FIG. 2. To CPU 124, non-volatile memories (NVM) 113 are connected. The memories act as the weight conversion coefficient recording area 13 and the excessive weight recording area 14 in FIG. 2, so that the stored data may not be deleted even if the electric power becomes off. Also, to CPU 124, signal output terminals O and O1 to On are connected via an interface (I/F) circuit 123.

The signal output terminal O outputs a load weight W having summed up the weights calculated by the load sensor signals inputted to the input terminals I1 to In. The signal output terminals O1 to On output the weights W1 to Wn calculated from the weight sensor signals inputted to the input terminals I1 to In. Besides, designated 130 is a power circuit to supply an electric power to each section of the system.

Next, the operation of the last-mentioned embodiment will be explained as referring the flow chart in FIG. 9. The main routine shown in the flow chart (a) starts to execute the following process steps when an accessory (ACC) switch in the vehicle provided with the system becomes on.

Step S101 completes an initial setting, and also resets the areas, which are shown in FIG. 10, in a work region in RAM 124b. The areas are a 2-second timer area b1, a 6-second timer area b2, a HF flag area b3, a KF flag area b4, a SP flag area b5, and a calculated weight W1 area b6. Step S101 also sets the display 117 to display an initial value of zero ton.

Further, the HF flag area b3 is set to zero every time a 2-second timer provided in the 2-second timer area b1 times out. The HF flag area b3 is changed to 1 from 0 every time the run sensor signal output terminal I receives a pulse. The KF flag area b4 is set to 1 every time a 6-second timer provided in the 6-second timer area b2 starts. The KF flag area b4 is set to 0 every time the 6-second timer times out. The SP flag area b5 is set to 0 just before the 2-second timer provided in the 2-second timer area b1 starts. The HF flag area b3 is changed to 1 from 0 every time the run sensor signal output terminal I receives a pulse.

The following step S102 sets the SP flag area b5 in the work area to 0. Then, step S103 makes a 2-second timer, which is an indication updating timer, start. The following step S104 detects the weight sensor signals received in the weight sensor input terminals I1 to In. Thereby, as shown in the aforementioned equation (1), a frequency is obtained according to a number of pulses received during To period.

The step S105 calculates a load weight W according to the aforementioned equations (2) and (3). The following step S106 stores the load weight W calculated by step S105 in a calculated weight W1 area b6. The following step 107 decides whether the 2-second timer having started in step S103 times out. The execution waits until the decision becomes YES.

When the decision in step S107 becomes YES, the execution proceeds to step S108 to set the HF flag area b3 to 0, and then proceeds to step S109. Step S109 decides whether the SP flag area b5 is 1 or not. That is, it decides whether the run sensor signal input terminal I has received a pulse during the last 2 seconds. When step S109 has decided NO, that is, when the run sensor signal input terminal I has not received a pulse during the last 2 second, the execution proceeds to step S110. While, When step S109 has decided YES, that is, when the run sensor signal input terminal I has received a pulse during the last 2 seconds, the execution proceeds to step S112.

Step S110 decides whether the KF flag area b4 is 0 or not. That is, it decides whether a 6-second timer provided in the 6-second timer area b2 is acting or not. When step S110 has decided YES, that is, when the 6-second timer is not acting and when a 6 second period has passed after the vehicle stopped running, the execution proceeds to step Sill to output, for the display 117, the carrying load W stored in the calculated weight W1 area b6 by step S106.

Further, step S112 makes the 6-second timer, which is provided in the 6-second timer area b2, start. The following step S113 sets the KF flag area b4 to 1. When step S110 has decided NO, that is, when the 6-second timer is acting or when step S113 has been executed, the execution proceeds to step S114. Step S114 decides whether the 6-second timer has timed out or not. If the step S114 decides NO, the execution returns to step S102. While, if the decision is YES, the execution returns to step S102 after the step S115 sets the KF flag area b4 to 0.

Figure 9:
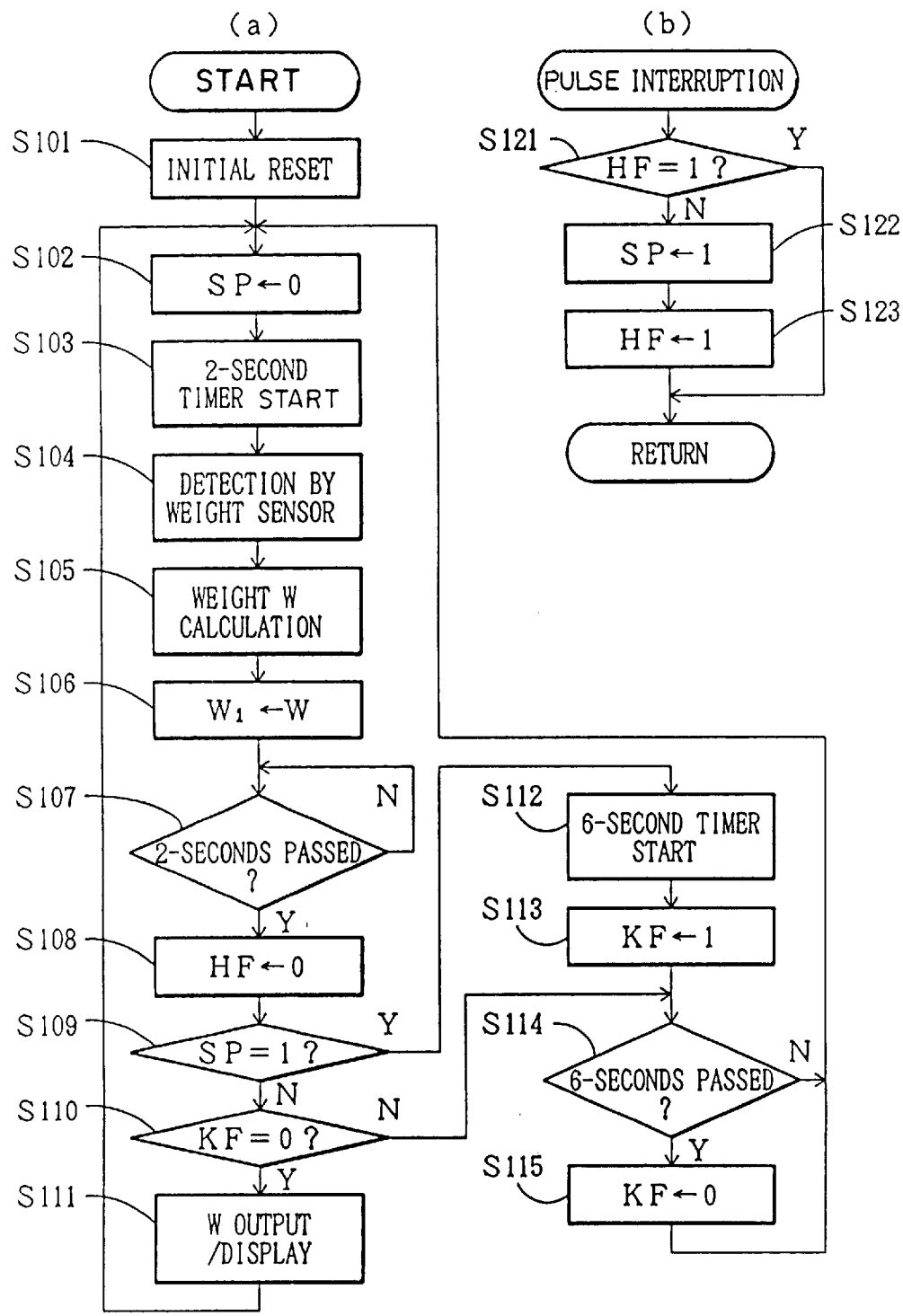
FIG. 9 is an operation flow chart of the embodiment in FIG. 8.

Besides, the CPU 124 executes an interrupt routine (b) in FIG. 9, when the CPU receives a pulse inputted in the run sensor signal input terminal I via the interface (I/F) circuit 122. And, the first step S121 decides whether the HF flag area b3 is 1 or not. That is, it decides whether a pulse is inputted or not during the last 2 seconds. If the decision in this step is NO, the execution proceeds to step S122 that sets the SP flag area b5 to 1, and then it proceeds to step S123. Step S123 sets the HF flag area b3 to 1, and then the execution returns to the main routine (a). While, if the decision in step S121 is YES, that is, if a pulse has been inputted during the last 2 seconds, the execution omits steps 122,123 and returns to the main routine.

The steps according to the aforementioned flow chart in FIG. 9, as shown in FIG. 11, detect the weight sensor signals that are inputted, within the first 0.5 second in every 2 second period, into the weight sensor signal input terminals I1 to In in step S104. And, step S105 calculates the load weight W, during the remaining period, by the detected weight sensor signals in step S104. If the interrupt routine (b) is carried out in any time of the 2 seconds, step S111 is not executed after the 2 seconds has passed. Therefore, the display 117 does not display the load weight W calculated in step S105.

Consequently, when a run pulse from the run sensor is inputted, the load weight calculated within the last predetermined period is not displayed in the display 117. That is, even if the weight varies at the actual start of the vehicle running although the wheels do not yet rotate so that the run pulse is not outputted, it is completely eliminated that the display displays thus varying load weight.

In the above-mentioned embodiment, if a run pulse is not inputted during a Tw period (6 seconds), it is decided that the vehicle is stopping so that the load weight is calculated and also displayed. However, the calculated load weight may be affected by the condition of the road where the vehicle is stopping. Thereby, there may be a disadvantage that the displayed weight updated every more than Tw period is different from the carrying correct load calculated prior to the run.

Therefore, another embodiment constructed so as to eliminate the disadvantage will be explained as referring to FIGS. 12 and 13.

The hardware in these embodiments is the same one of the load weight display system shown in FIG. 8. But, the group of switches 120 includes a loading and unloading switch comprising of a momentary switch outputting a signal by being pushed. Further, the RAM 124b provided in the CPU 124 includes, as shown in FIG. 13, a 2-second timer area b1, a 6-second timer area b2, a HF flag area b3, a KF flag area b4, a SP flag area b5, a presently calculated weight W1 area b6, a HKF flag area b7, a previously calculated weight W2 area b8, and a displaying weight $W_D$ area b9. Moreover, the CPU 124 executes an interrupt routine (c) in FIG. 12 that starts according to the operation of the loading and unloading switch.

Figure 12:
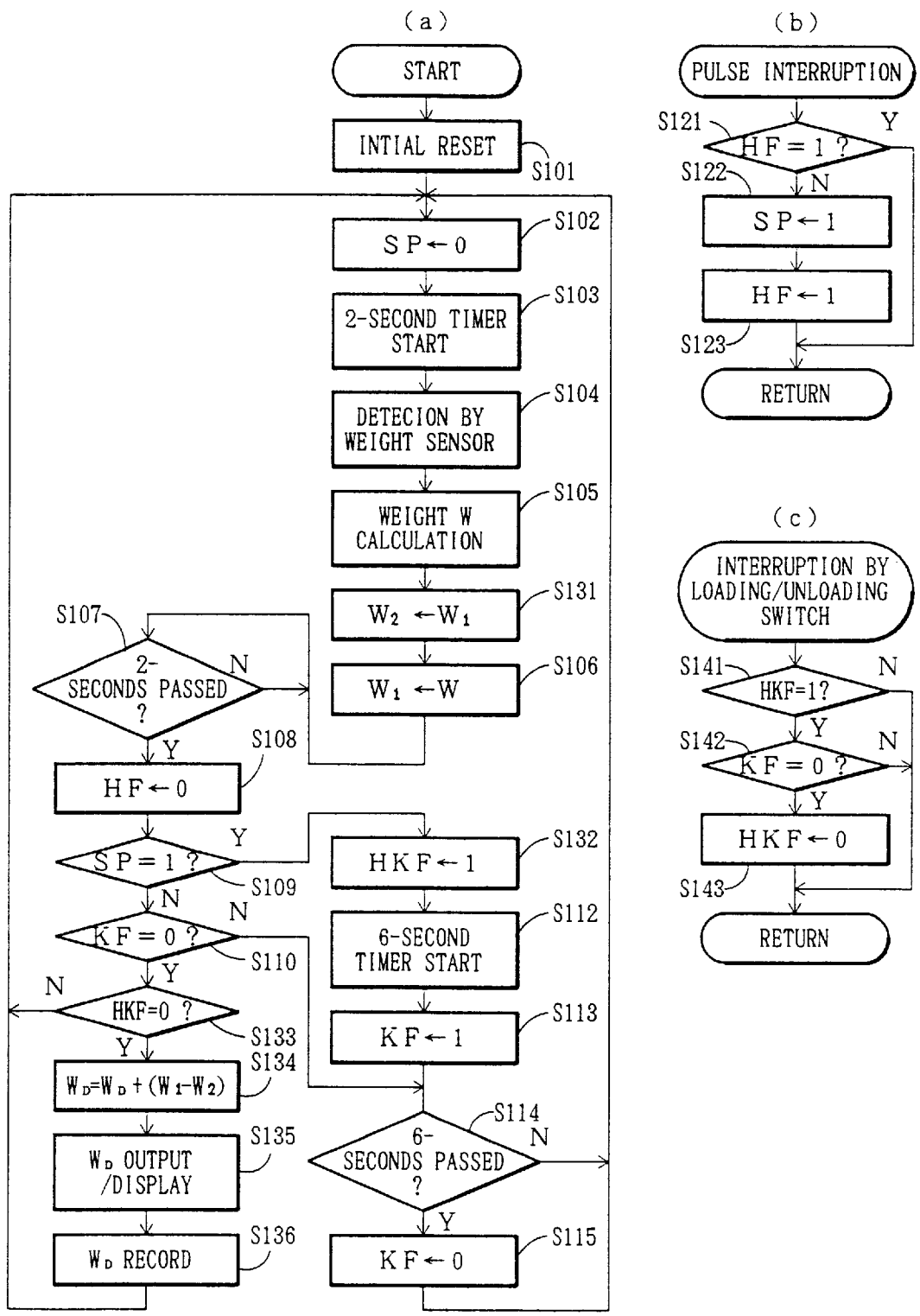
FIG. 12 is another operation flow chart of the embodiment in FIG. 8.

The work area in the RAM 124b is reset during the initial part of the first step S101 in the flow chart, shown in FIG. 12, which starts when the ACC switch becomes on. And, the interrupt routine (c) in respect of the loading and unloading works, which starts by the operations of the loading and unloading switch, decides whether the HKF flag area b7 is 1 or not in the first step S141. If the decision is YES, the execution proceeds to the following step S142. While, when the decision is NO, the execution returns to the main routine (a). Further, step S142 decides whether the KF flag area b4 is 0 or not. If the decision is YES, the execution proceeds to step S143. While, when the decision is NO, the execution returns to the main routine (a). Besides, step 143 sets the HKF flag area b7 to 0 and the execution returns to the main routine (a). Consequently, the operation of the loading and unloading switch sets the HKF flag area b7 to 0.

Steps S102 to S105 following to step S101 are similar to the steps of the flow chart in FIG. 9. Step S131 following to step S105 stores the data of the presently calculated weight W1 area b6 in the previously calculated weight W2 area b8. Then, step S106 stores the calculated weight W, which is obtained in step S105, in the presently calculated weight W1 area b6. Next, Steps S107 to S109 follows, which are similar to the steps of the flow chart in FIG. 9. If the decision in step S109 is YES, step S132 is executed. Step 132 sets the HKF flag area b7 to 1, and steps S112 to S115 follows, which are similar to the steps of the flow chart in FIG. 9. As a result, it is recognized by knowing that the HKF flag area b7 has been set to 1 that the vehicle has started to run after the operation of the loading and unloading switch.

When the decision in step S110 is YES, that is, when the KF flag area b4 is 0, which shows that 6 seconds has passed since the vehicle stopped, the execution proceeds to steps 133 that decides whether the HKF flag area b7 is 0 or not. When the decision is NO, that is, when 6 seconds has passed without the operation of the loading and unloading switch since the vehicle stopped, the execution returns to step S102. While, when the decision is YES, that is, when 6 seconds has passed, with the operation of the loading and unloading switch, since the vehicle stopped, the execution proceeds to step S134. Step S134 calculates the difference in the values between the presently calculated weight W1 area b6 and the previously calculated weight W2 area b8, and adds the difference to the value in the displaying weight $W_D$ area b9 so as to obtain a new displaying weight $W_D$. Then, the following step S135 outputs the new displaying weight $W_D$ to the display 117, and the next step S136 stores the new weight in the displaying weight $W_D$ area b9 by altering the previous one. After that, the execution returns to step S102.

Steps S133 to S136 obtains the difference between the presently calculated weight and the previous one calculated 2 seconds before; adds the weight difference to the presently indicated weight: and indicates the obtained weight. At that time, the loading and unloading switch is operated according to the loading and unloading works after the vehicle's stop. Therefore, the display 117 can keep to display correct carrying loads with no effects of variations in weights caused by the vehicle's stopping condition.

However, in the above-mentioned embodiment, the loading and unloading switch must be operated before the loading and unloading works. If it is not correctly operated in sequence, the weight loaded or unloaded during the period from the vehicle's stop to the operation of the loading and unloading switch is not correctly added to the displaying weight. That is, the correct difference in the load weights due to the loading or the unloading is not caught, and thereafter the load weight display system does not work correctly. In order to know the correct load weight, all of the cargoes should be unloaded and loaded again to calculate the load weight. It is a disadvantage in the above-mentioned embodiment.

Therefore, another embodiment constructed so as to eliminate the disadvantage will be explained as referring to FIGS. 14 and 15.

The hardware in these embodiments composes of the same one of the load weight display system shown in FIG. 8. And, the group of switches 120 may not include a loading and unloading switch.

As there are no loading and unloading switches, the interrupt routine (c) in FIG. 12 is unnecessary. While, the RAM 124b provided in the CPU 124 includes, as shown in FIG. 15, a standard weight Ws area b10 and a deviation value $\Delta W$ area b11, in addition to the areas b1 to b9 in FIG. 13.

Figure 14:
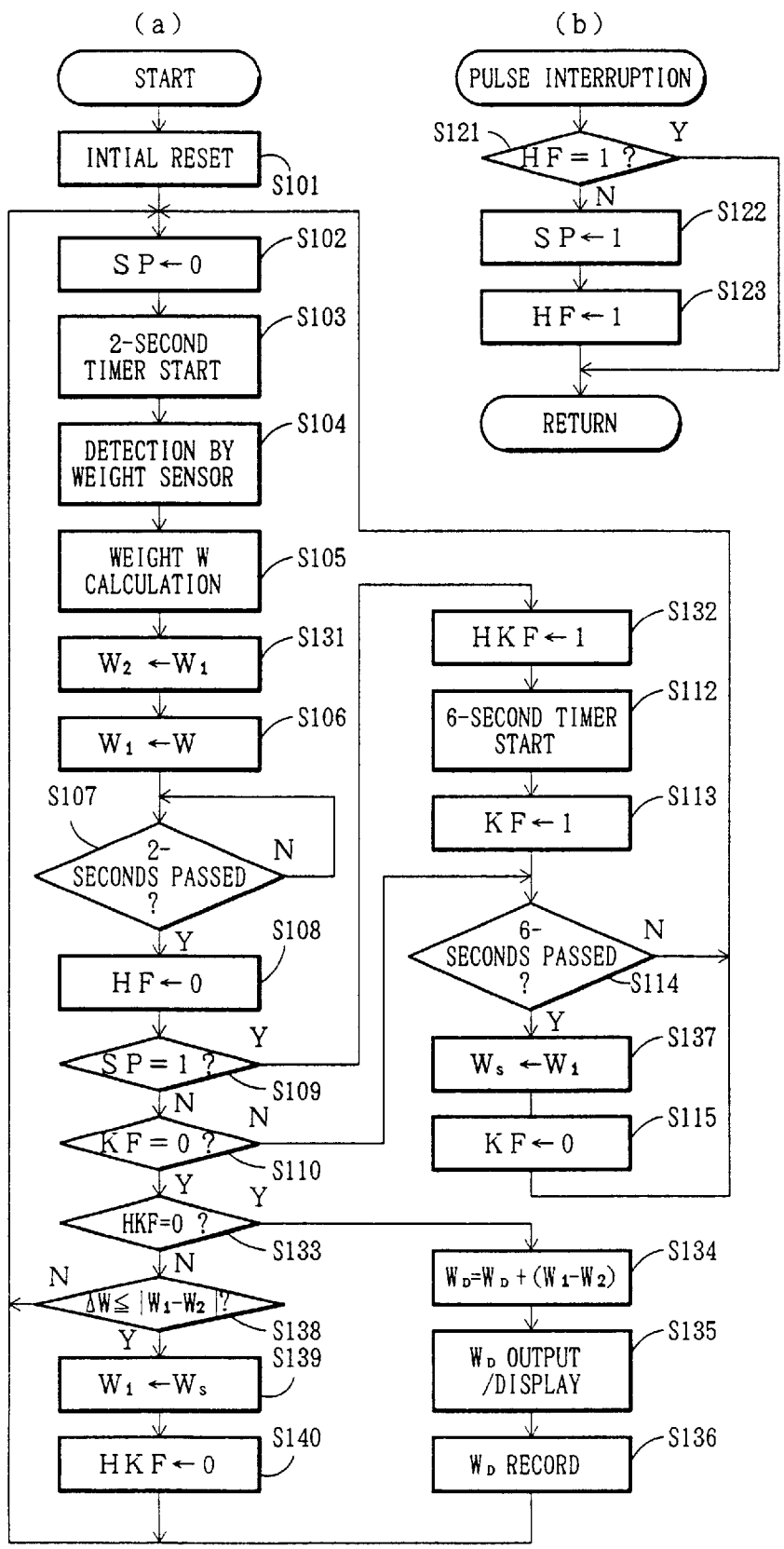
FIG. 14 is further another operation flow chart of the embodiment in FIG. 8.

In the initial part of the first step S101 of the flow chart shown in FIG. 14, the standard weight Ws area b10 is reset and also the deviation value $\Delta W$ area b11 is set to a given value between, for example, 0.1 and 1 ton. Steps S102 to S115 and S131 to S136 are the same as the steps mentioned in FIG. 12. When the decision in step 114 is YES, the execution proceeds to step S137. Step S137 stores the value of the presently calculated weight W1 area b6, which is the weight W calculated in step S105 and has been stored in the area b6 by step S106, in the standard weight Ws area b10. That is, the standard weight in the stopping time is the weight W calculated just before 6 second period passes after the vehicle's stop. The standard weight is used in the following steps.

Further, when the decision in step S133 is NO, that is, when 6 seconds has passed after the vehicle's stop, the execution proceeds to step S138. Step 138 decides whether the absolute value of the difference between the value in the presently calculated weight W1 area b6 and the value in the standard weight Ws area b10 is equal to or more than the value in the deviation $\Delta W$ area b11. That is, step 138 decides $\Delta W \leq |W1-Ws|$. This decides whether loading and unloading works have been carried out or not thereafter by knowing whether the load weight during the vehicle stopping duration has been differed by more than $\Delta W$. When the decision is NO, the execution returns to step S102. When the decision is YES, the execution proceeds to step S139 that stores the value of the standard weight Ws area b10 in the presently calculated weight W1 area b6, and further the execution returns to step S102 after the following step S140 sets the HKF flag area b7 to 0.

After the step S140, as mentioned above, sets the HKF flag area b7 to 0, in so far as the vehicle is stopping, step S 133 decides YES so that steps S 134 to S136 are executed. Thereby, the difference in the load weights caused by the loading and unloading works while the vehicle is stopping is added to the presently displaying weight so as to update the displaying value.

As mentioned above, when 6 seconds has passed after the vehicle's stop, it is decided whether there is a difference in weight, which is more than a given value of $\Delta W$, to the standard weight during the vehicle stopping duration. Thereby, it is decided that the loading and unloading works is carrying out so that the difference in the load weights is sequentially added to the presently displaying weight in order to automatically update the displaying weight. Therefore, it does not need manually operated means such as the loading and unloading switch, and also can eliminate the disadvantage that the correct load weight becomes unknown due to an unintentionally omission in operation.

Consequently, the following effects are obtained in the invention.

Since the weight obtained prior to a run is displayed during the run, a correct load weight can be displayed even if the dynamic loads provided on the sensors vary due to the vehicle running.

Further, since, when it is decided that the vehicle is running, the weight calculation process is stopped to display the weight obtained prior to a run, the load of a processor in use may be reduced.

Further, since whether the vehicle is running or is stopping is decided by recognizing the presence of a run pulse from a run sensor mounted in the vehicle, it is easy to decide whether the vehicle is running or not.

Further, since the weight obtained prior to a run is displayed even during a given stopping period after the run, a correct carrying load can be displayed instead of displaying the load affected by the sway of the vehicle in a transient period just after the vehicle has stopped.

Further, when the difference between the previously calculated weight and the presently displaying weight becomes larger than a predetermined value, the calculated weight is displayed. Therefore, since the weight indication is changed only when the carrying load is changed by the loading or the unloading, correct carrying loads can be displayed.

Moreover, correct carrying loads can be displayed even if the loads provided to the sensors may vary before a run.

Further, since the difference in the load weights caused by the loading and unloading works is added, the correct carrying load can be displayed even if the place where the vehicle is stopping during the loading and unloading works has an inclination.

Moreover, the displaying weight is changed to display the correct load weight, only when the load weight is changed by loading and unloading works. Also, no manual operation is needed, which can surely eliminate the disadvantage that the present load weight becomes unknown by unintentionally omitting the manual operations.

What is claimed is:

1. A vehicle-load-weight display system comprising:
   a weight calculating means for obtaining a load weight from output signals of sensors mounted in the vehicle;
   a display means for displaying the load weight obtained by said calculating means; and
   a display control means for controlling said display means to only display the load weight obtained prior to movement of the vehicle.

2. A vehicle-load-weight display system according to claim 1,
   wherein said display control means decides whether the vehicle is moving by a run pulse outputted from a run sensor in the vehicle.

3. A vehicle-load-weight display system according to claim 1,
   wherein said display control means controls said display means so as to display the load weight obtained prior to the movement of the vehicle, even during a predetermined stopping period after the movement of the vehicle.

4. A vehicle-load-weight display system according to each of claims 1, 2 or 3,
   wherein, if said display control means decides that the vehicle is moving, said display control means stops said weight calculating means from calculating the load weight so as to display the load weight obtained prior to the movement of the vehicle by said display means.

5. A vehicle-load-weight display system according to claim 1, wherein said weight calculating means obtains the load weight from output signals provided by weight sensors during an initial part of each of a plurality of predetermined periods, and said display control means decides whether the vehicle is moving by a run pulse outputted from a run sensor in said each of the plurality of predetermined periods.

6. A vehicle-load-weight display system according to claim 5, further comprising a detecting means for detecting a start of loading and unloading works after a predetermined time has passed after stopping of the movement of the vehicle,
   wherein, during a time period from the start of loading and unloading works to the start of the vehicle movement, said weight calculating means calculates the difference in the load weights between a present period and a previous period, and moreover said display control means controls said display means to display the present load weight obtained by adding said difference in the load weights to a previously displayed weight.

7. A vehicle-load-weight display system according to claim 6,
   wherein said detecting means detects the start of loading and unloading works by detecting a manual operation of a switch.

8. A vehicle-load-weight display system according to claim 6,
   wherein said detecting means detects the start of loading and unloading works by recognizing that said difference in the load weights between when a predetermined time has passed after stopping of the vehicle movement and when a second load weight is newly calculated thereafter becomes larger than a predetermined value.

9. A vehicle-load-weight display system according to claim 5,
   wherein said each of the plurality of predetermined periods is substantially equal to a time period from a first power transmission to a start of wheel rotation.

10. A vehicle-load-weight display system according to claim 6,
    wherein said predetermined time is substantially equal to a time period from stopping of the vehicle running to ceasing of the vehicle's sway motion.

11. A vehicle-load-weight display system for a vehicle comprising:
    a weight calculating means for obtaining a load weight from output signals of sensors mounted in the vehicle during an initial part of each of a plurality of predetermined periods when the vehicle is not moving;
    a display to display the load weight calculated by said weight calculating means; and,
    a display control means for controlling said display to display the load weight calculated prior to the movement of the vehicle,
    wherein the movement of the vehicle is determined by a run pulse generated by a run sensor during any part of one of the plurality of predetermined periods.

12. A vehicle-load-weight display system for a vehicle comprising:
    a weight calculating means for obtaining a load weight from output signals of sensors mounted in the vehicle;
    a display to display the load weight calculated by said weight calculating means; and,
    a display control means for controlling said display to display the load weight calculated prior to movement of the vehicle and excluding a load weight variation occurring during a time period from a start of power transmission to a start of wheel rotation.

13. A vehicle-load-weight display system for a vehicle comprising:
    a weight calculating means for calculating a load weight based on output signals of sensors mounted in the vehicle prior to movement of the vehicle and stopping calculation during the movement of the vehicle;
    a display to display the load weight calculated by said weight calculating means; and,
    a display control means for controlling said display to display the load weight calculated prior to the movement of the vehicle.

* * * * *